Dec. 13, 1955 — E. L. TORNQUIST ET AL — 2,727,085
SUPPRESSING GALLOPING CONDUCTORS
Filed Dec. 19, 1949 — 6 Sheets-Sheet 1

INVENTORS
Earl L. Tornquist,
BY Carl Becker,
Brown, Jackson,
Boettcher & Dienner
Attys.

Dec. 13, 1955  E. L. TORNQUIST ET AL  2,727,085
SUPPRESSING GALLOPING CONDUCTORS
Filed Dec. 19, 1949  6 Sheets-Sheet 4

INVENTORS
Earl L. Tornquist,
Carl Becker,
BY Brown, Jackson, Boettcher
+ Drenner
ATTYS

Dec. 13, 1955     E. L. TORNQUIST ET AL     2,727,085
SUPPRESSING GALLOPING CONDUCTORS
Filed Dec. 19, 1949                     6 Sheets-Sheet 5

INVENTORS
Earl L. Tornquist,
Carl Becker,
BY Brown, Jackson, Boettcher
& Dienner
ATTYS.

Dec. 13, 1955  E. L. TORNQUIST ET AL  2,727,085
SUPPRESSING GALLOPING CONDUCTORS
Filed Dec. 19, 1949  6 Sheets-Sheet 6

INVENTORS
Earl L. Tornquist,
Carl Becker,
BY Brown, Jackson, Boettcher & Dienner
ATTYS.

United States Patent Office 2,727,085
Patented Dec. 13, 1955

2,727,085

SUPPRESSING GALLOPING CONDUCTORS

Earl L. Tornquist, Elmhurst, and Carl Becker,
Oak Park, Ill.

Application December 19, 1949, Serial No. 133,916

12 Claims. (Cl. 174—42)

The present invention relates to apparatus for suppressing or mitigating the large amplitude oscillations of aerial conductors called "galloping." Such galloping oscillation is wind-induced, but does not require high velocity winds because conductors have been known to gallop very vigorously under ordinary wind conditions. In the operation of an overhead electrical transmission and distribution system, galloping of conductors often results in considerable damage to line and overhead structures. Violence of the galloping is often sufficient to cause contact between conductors, with resultant tripping out of the line, and in a general storm may constitute a serious threat to continuity of service. Because of its seriousness, this problem has prompted much study and research by the industry in the hope of finding a practical solution.

Although galloping is known to take place under widely different conditions, the published literature and many private reports indicate that in most of the cases which have affected operation of power lines, glaze or snow was present on the conductors. In many of these incidents, the glaze was approximately one-quarter of an inch or more thick at its thickest point, but in other cases, on conductors as large as one inch or so in diameter, it was only of the order of one-sixteenth inch, or even less. Moreover, there are reports of aerial conductors galloping where no glaze or snow was present. Here, the conductors ranged in size from No. 4 (0.204 inch diameter) bare, solid, copper wire to lead-sheathed telephone cables, 2.5 inches in diameter. It can be seen from these examples of galloping that the effect is produced under a variety of conditions. All forms of galloping, however, may be found to be susceptible to mitigation or alleviation by the same means.

The general object of the present invention is to provide improved apparatus for suppressing or mitigating such galloping oscillation of aerial conductors. In this regard, it is a more specific object of the invention to provide improved apparatus which will be effective irrespective of different characteristic motions of the galloping oscillation. For example, the galloping oscillation may be in the form of two loops in each span of the conductor, and either with a stationary node or a node moving up and down. Also, the galloping oscillation may be in the form of one loop for each span, with adjacent spans substantially 180° out of phase (i. e. with adjacent spans moving up and down in opposite directions). Still further, the galloping may be in the form of two loops with adjacent spans either in phase or out of phase. The foregoing galloping motions are merely referred to for illustrative purposes, because, in fact, the galloping motions may assume an infinite variety of forms or configurations. Our improved apparatus is effective to mitigate or damp all of these forms of galloping motion.

Another object of the invention is to provide improved apparatus of the above description which will be relatively inexpensive to construct and install. This cost of manufacture and installation is an important factor, because there would have to be a very large number of these restraining units on long transmission lines, there preferably being one of these units installed at approximately every pole or every other pole or tower.

Another object of the invention is to provide oscillation suppressing apparatus of this general description which will not impair or lessen the effective insulation of the conductor with respect to supporting cross-arms, adjacent conductors, etc. In high voltage transmission systems it is essential that the insulation value of the conductor by virtue of insulator supports, position of the conductor, etc. be not appreciably impaired by any oscillation dampening apparatus.

Complete mitigation or 100% suppression of the wind-induced oscillations is not necessary for a satisfactory solution of the problem, and would probably be impossible to obtain in any suspended span. We have conducted extensive tests in the field which indicate that approximately 50% reduction in the amplitude of the galloping would provide contact-free operation during galloping. Also, with regard to the design and erection of new transmission lines, in which there has been an increasing tendency to provide sufficient separation between adjacent conductors so that they cannot come into contact with each other during galloping, any material reduction in the amplitude of galloping would be reflected in a reduction in cost of the new construction. It should also be recognized in connection with partial mitigation that this will greatly reduce the damage to structures which in the past have suffered severely during periods of galloping. Evidence indicates that the damage done by a galloping of large amplitude is considerably greater than that caused by one of one-half that amplitude, and the extent of damage is greater than the ratio between these two figures. We have also observed in our field tests on experimental lines that the residual galloping with the mitigating devices installed does not have the "snap" or "whip" that is present in the unmitigated galloping.

Other objects, features and advantages of the invention will appear from the following detail description of certain preferred embodiments of the invention. In the accompanying drawings illustrating such embodiments.

Figure 1:
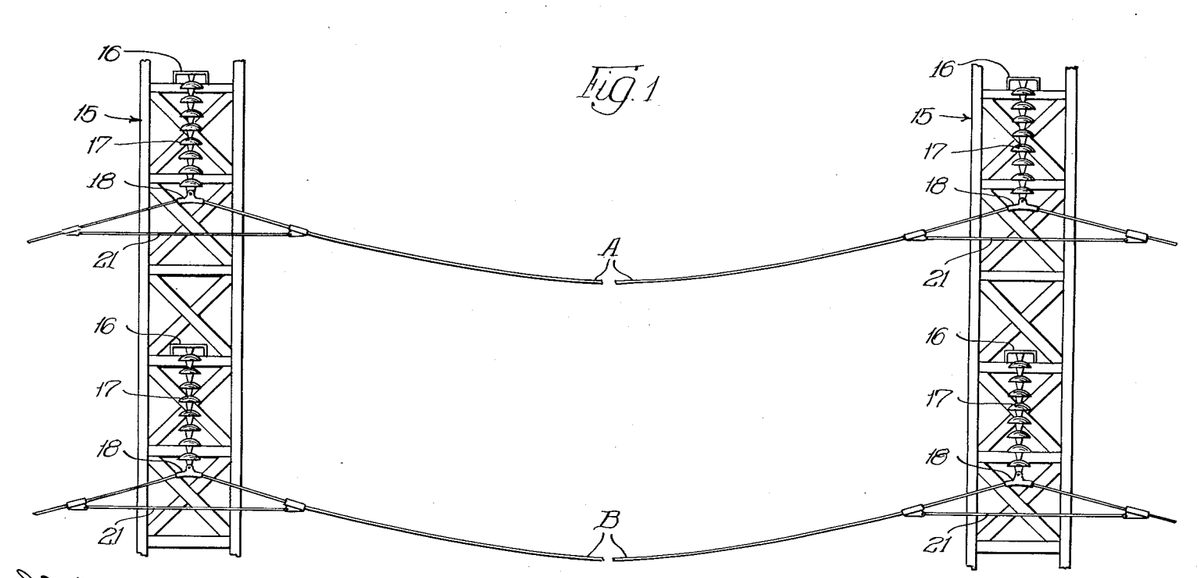
Figure 1 is a diagrammatic side view of a high voltage transmission line, illustrating one relatively simple embodiment of our invention utilizing a cross-tie connecting adjacent spans of the conductor.

In Figure 1 we have diagrammatically illustrated a portion of a high voltage transmission line, wherein the conductors are illustrated as being suspended in long spans between supporting towers or poles 15. These supporting towers usually have vertically spaced cross arms 16 projecting outwardly from the sides thereof, and these cross arms have high voltage insulators 17 suspended therefrom, which support the conductors at their lower ends through mounting clamps 18. The insulators 17 can swing relatively to the cross arms, and the clamps 18 may have swinging freedom relatively to the insulators. The conductors are usually arranged in groups of three for a conventional three-phase circuit, conductors A and B of Figure 1 representing two conductors of such a three-phase group. The length of span between towers may range anywhere from 100 feet to 1000 feet, or possibly even longer.

We mount our oscillation damping units at the points of conductor support, i. e. at the points where the conductor has support from the cross-arms 16 through the insulators 17 and clamps 18. One of these oscillation damping units may be mounted at each supporting cross-arm, or they may be mounted at alternate cross-arms, or in any other sequence or pattern, depending upon length of span, weather conditions, etc.

Figure 2:
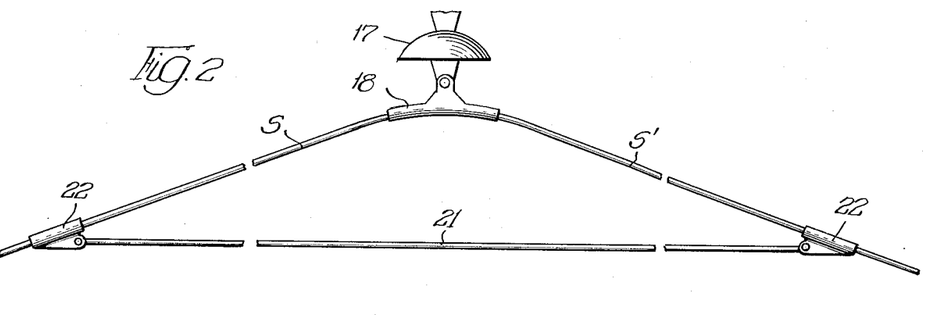
Figure 2 is a fragmentary side view on a larger scale showing this cross-tie embodiment of our invention.

In one relatively simple embodiment of our invention illustrated in Figures 1 and 2, we connect a wire cross-tie 21 between adjacent spans S of the conductor indirectly under a point of support 16—18. These wire cross-ties 21 are clamped or otherwise attached to the conductor at points spaced far enough out along each span S as to exert substantial damping effect upon large amplitude oscillations in the span. Such a cross-tie appears to exert its damping effect largely by wave or phase interference, or possibly other interacting relations, between adjacent spans. For example, in some galloping motions of adjacent spans, the wire cross-tie apparently transmits energy from one span for absorption by the other span in one phase of the motion, and vice versa in another phase of the motion.

Figure 3:
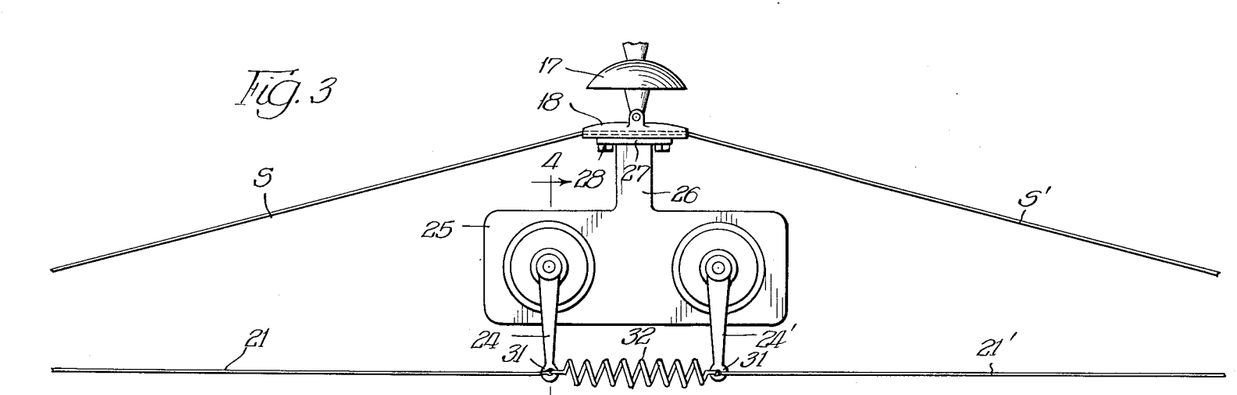
Figure 3 is a similar diagrammatic view, showing the wire cross-ties operatively connected with energy absorbing pivoted arms.
Figure 4:
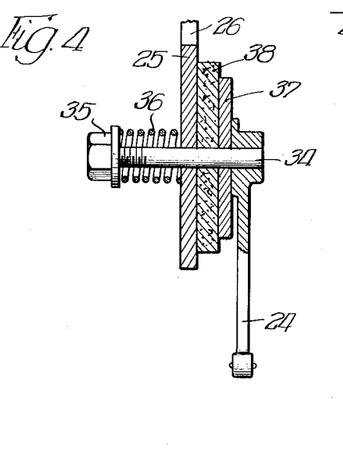
Figure 4 is a vertical sectional view through one of these pivoted arms, taken approximately on the plane of the line 4—4 of Figure 3, illustrating one arrangement of relatively slipping friction surfaces for damping the pivoted motion of said arms.

Referring now to Figures 3 and 4, in this embodiment we connect the wire cross-tie 21 with two energy absorbing pivoted arms 24, 24' which react against a mounting member 25. This mounting member 25 preferably consists of a steel plate having an upwardly extending arm 26 provided with a bolting flange 27 which has bolted attachment at 28 to the mounting clamp 18 which clamps to the conductor. Such mounting arrangement suspends the damper assembly from the lower end of the supporting insulator 17. The cross-tie is divided into left and right sections 21 and 21', respectively, which are pivotally tied or clamped at 31 to the lower ends of their respective energy absorbing pivoted arms 24 and 24'. A tension spring 32 is operatively connected between the two sections of the wire cross-tie and between the two pivoted arms, this spring functioning as a restoring force for restoring the pivoted arms substantially to the positions shown in Figure 3.

Referring now to Figure 4, each arm 24, 24' has a torque resisting pivotal connection with the steel mounting plate 25 which damps oscillation of the arm in either direction relatively to the plate. Each arm is mounted upon a pivot shaft 34 which extends rearwardly through the plate 25 with a rotative and sliding fit. A nut 35 screws over a thread on the rear end of this shaft and adjusts the pressure of a compression spring 36 which surrounds the shaft and abuts against the back side of the plate 25. The pivoted arm is secured to a metallic friction disk 37, and is adapted to bear against a disk or ring 38 of friction material which is riveted or otherwise secured to the steel plate 25. The friction disk 38 may be composed of brake lining material, clutch facing material, powdered metal material, grindstone material, or the like; preferably some material in which the coefficient of friction will not be adversely affected by rain, snow, ice, etc. The pressure of the spring 36 holds the rotative disk 37 and stationary disk 38 pressed against each other, and by adjusting the pressure of this spring any desired torque resisting moment can be given the pivoted arm. This torque resisting moment is preferably so adjusted that the pivoted arm will yield with a retarded pivoting movement to a tensile pull through the cross-tie connection 21 or 21' corresponding to an oscillation in the adjacent span of the conductor. The tension of the restoring spring 32 also augments the braking torque imposed upon the pivoted arm to such pivoting movement. The pressure between the friction slippage surfaces 37, 38 and the tension of the restoring spring 32 are appropriately adjusted to the length of span, sag of span, design of the damping assembly, etc., so as to secure a maximum mitigation or reduction of amplitude of the galloping motion. The restoring spring 32 is so proportioned in restoring strength that it is capable of restoring both of the pivoted arms 24, 24' to their normal positions shown approximately in Figure 3, as soon as the conductor spans have relaxed their tension pull on the cross-tie connections 21, 21'. This restoring action can occur with sufficient rapidity to keep in phase with any galloping oscillations in the conductor spans, even of relatively high frequency.

Figure 5:
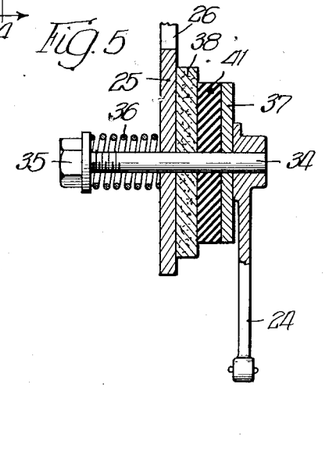
Figure 5 is a view similar to Figure 4 illustrating another arrangement of relatively slipping friction surfaces for these arms.

In Figure 5, we have illustrated a modified construction which differs from the preceding embodiment only in that a non-corrosive disk 41 is secured to the inner face of the rotative steel disk 37, so that the relative slippage occurs between the inner surface of this non-corrosive disk 41 and the outer surface of the brake lining disk 38. This non-corrosive disk may be composed of rubber, synthetic rubber substitute, metallic alloy, composition, or other material of such nature that weather cannot cause a corrosive adhesion between the two relatively rotatable disks 38 and 41.

Figure 6:
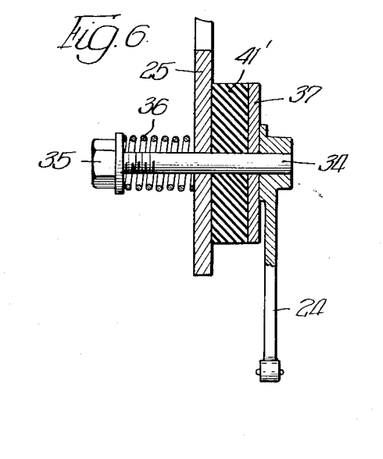
Figure 6 is another view similar to Figure 4, illustrating a different arrangement wherein energy absorption through the pivoted arm occurs by flexure of a yieldable material.

Figure 6 illustrates another modified construction wherein the energy loss occurs by flexure within a flexible disk 41' having a high energy loss characteristic, composed, for example, of rubber or any of the synthetic rubber substitutes specially compounded for that purpose. This disk 41' has its front face cemented, vulcanized or otherwise secured to the rotatable disk 37 and has its rear face similarly secured to the mounting plate 25. Thus, there is no friction slippage in this latter construction, but all relative movement of the pivoted arm with respect to the mounting plate is absorbed as flexure within the body of the flexible disk 41'.

The operating characteristics of both Figures 5 and 6 can be obtained by having the non-corrosive disk 41 of Figure 5 composed of the flexible material of Figure 6, such as rubber or a specially compounded synthetic rubber substitute. Thus, small amplitude oscillations would then be damped by the flexing absorption of energy within the body of the flexible disk and large amplitude oscillations would be damped by frictional absorption of energy between the relatively rotating faces of the two disks.

Figure 7:
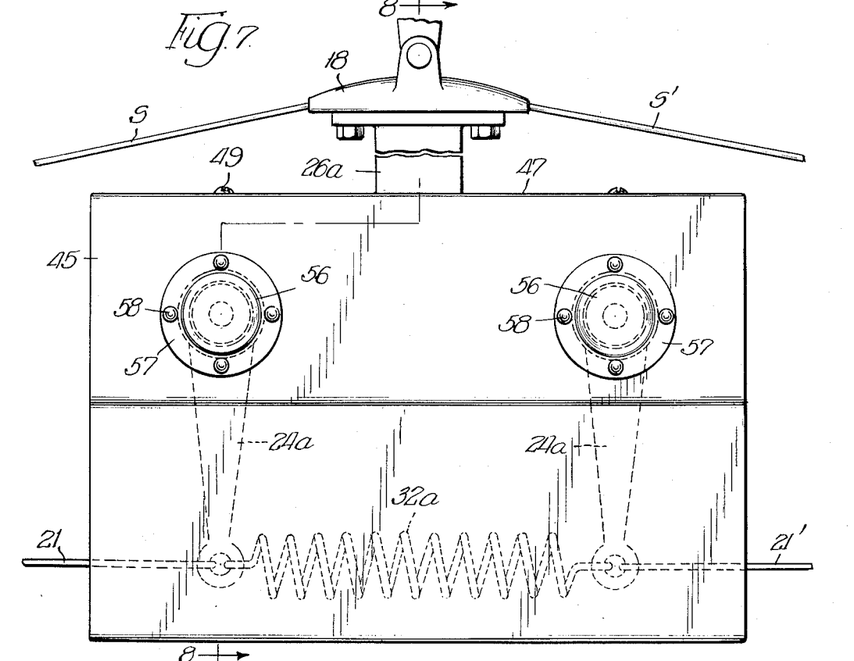
Figure 7 is a front view illustrating a different embodiment wherein the damping elements are housed against the weather.
Figure 8:
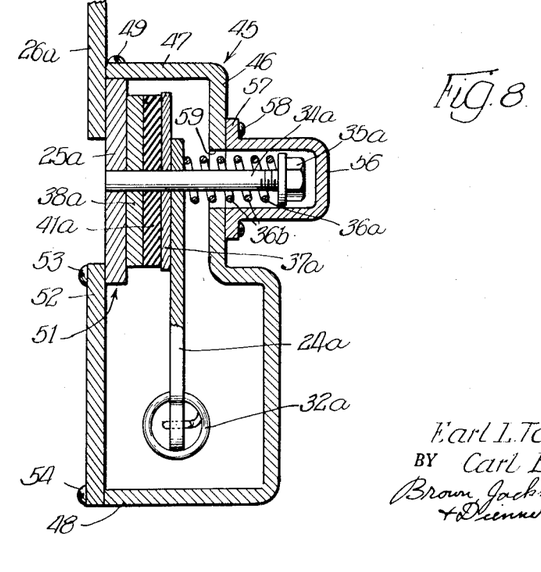
Figure 8 is a transverse sectional view taken approximately on the plane of the line 8—8 of Figure 7.

In Figures 7 and 8, we have illustrated a further variation of the embodiments shown in Figures 4, 5 and 6, wherein the damping elements are housed against the weather. The suspension arm 26a may be an integral extension of the mounting member 25a, but preferably consists of a separate piece which is bolted or welded to the back of the mounting member 25a in order to facilitate mounting a housing thereon. In this construction, the pivot shafts 34a extend forwardly from the mounting member 25a so as to dispose the adjustable compression springs 36a within the housing which encloses the frictional surfaces. This housing, designated 45, comprises a front plate portion 46 having rearwardly extending top and bottom flanges 47 and 48. The top flange 47 extends over the top edge of the mounting plate 25a, and is releasably secured thereto by screws or bolts 49. The bottom flange 48 is spaced downwardly from the lower edge of the mounting plate 25a so as to define an access opening 51 between this flange and the mounting plate. A removable cover 52 normally closes this access opening 51, such cover being secured by screws 53 and 54 to the mounting plate 25a and lower housing flange 48. The opening 51 affords access to the tension spring 32a connected between the pivoted arms 24a, when it is desired to change or adjust this tension spring. The housing 45 is open at both ends, or has appropriate openings therein, to permit the left and right sections 21, 21' of the wire cross-tie to enter the housing for establishing connection with the two pivoted arms 24a. Each pivoted arm 24a has a disk 37a welded or otherwise secured thereto, and secured to this disk is a non-corrosive disk 41a, preferably similar to the disk 41 or 41' of Figures 5 and 6. A friction disk 38a, preferably similar to the previously described friction disks 38, is secured to the front face of the mounting plate 25a and is adapted to have relatively rotatable frictional engagement against the rubber friction disk 41a. The relative frictional slippage between the opposing faces of these two disks 38a and 41a establishes the desired torque resisting moment on the pivoted arm 24a, as previously described. This can be adjusted by adjusting the pressure of the spring 36a. Such spring is enclosed within a cup-shaped housing 56 having an attaching flange 57 adapted to be secured to the front wall 46 of the housing by screws 58. This housing 56 closes a circular opening 59 through which the pivot shaft and spring assembly extend. Any of the other embodiments of damping mechanism illustrated in Figures 4, 5 and 6 may be employed in this enclosed embodiment.

Figure 9:
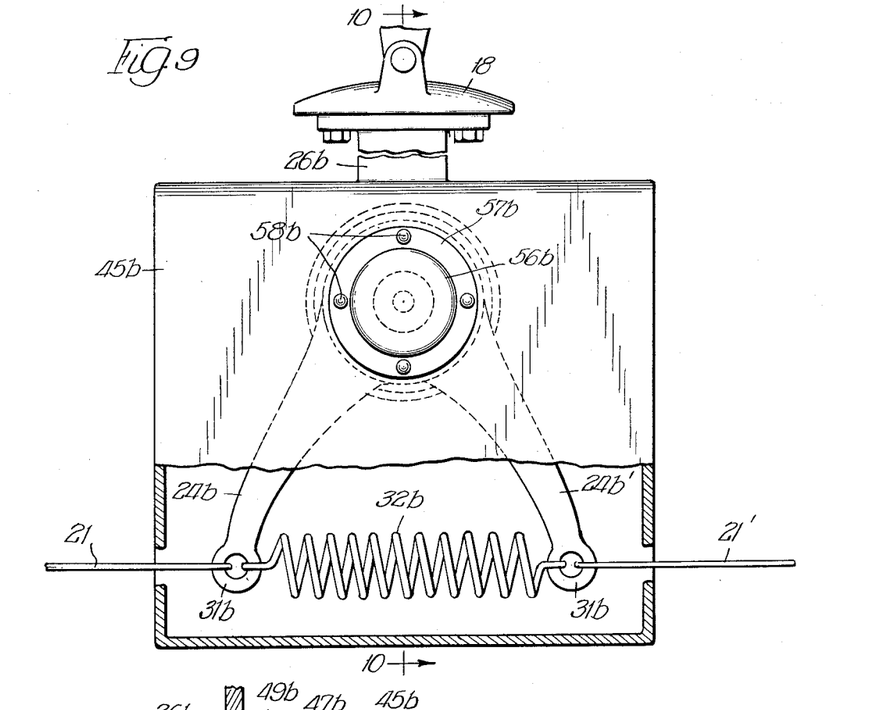
Figure 9 is a front view of another embodiment in which the two pivoted damping arms are coaxially mounted.
Figure 10:
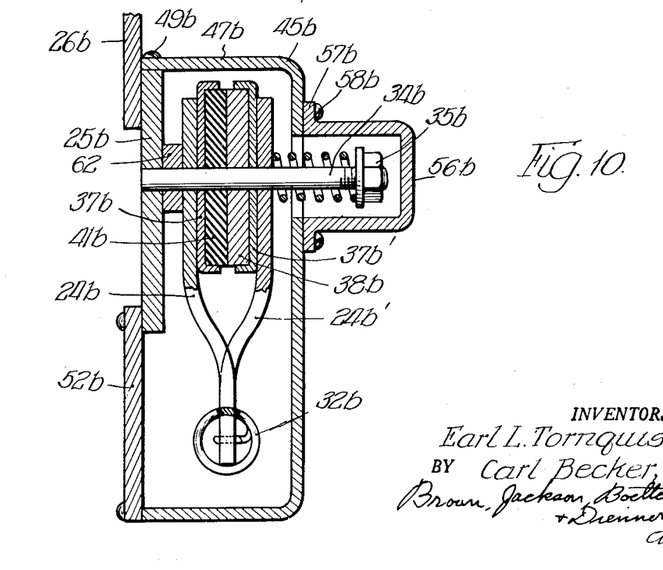
Figure 10 is a transverse sectional view taken approximately on the plane of the line 10—10 of Figure 9.

In Figures 9 and 10 we have shown another embodiment wherein the two pivoted damping arms are coaxially mounted on the same pivot shaft. These two arms, designated 24b and 24b', are both rotatably mounted upon a single pivot shaft 34b which has its rear end welded or otherwise anchored in the mounting plate 25b. Fastened to the arm 24b is a disk 37b to which is secured a friction disk 41b composed of rubber or the like. Attached to the other arm 24b' which is a mounting disk 37b' to which is secured a friction disk 38b composed of brake lining material, clutch facing material or the like. These two frictional disks 38b and 41b are held pressed together by a compression spring 36b mounted on the shaft 34b and arranged for adjustment by the nut 35b substantially as previously described. A washer 62 spaces the rear arm 24b from the mounting plate 25b.

As shown in Figure 9, the two arms 24b and 24b' diverge outwardly and downwardly so as to permit the connection of the tension spring 32b between their lower ends 31b. The left and right sections 21 and 21' of the wire cross-tie connect to these apertured ends 31b, which may be offset to lie in the same transverse plane. This embodiment is also enclosed within a housing 45b, which is the same as that shown in Figures 7 and 8, except that it only accommodates a single shaft assembly.

Figure 11:
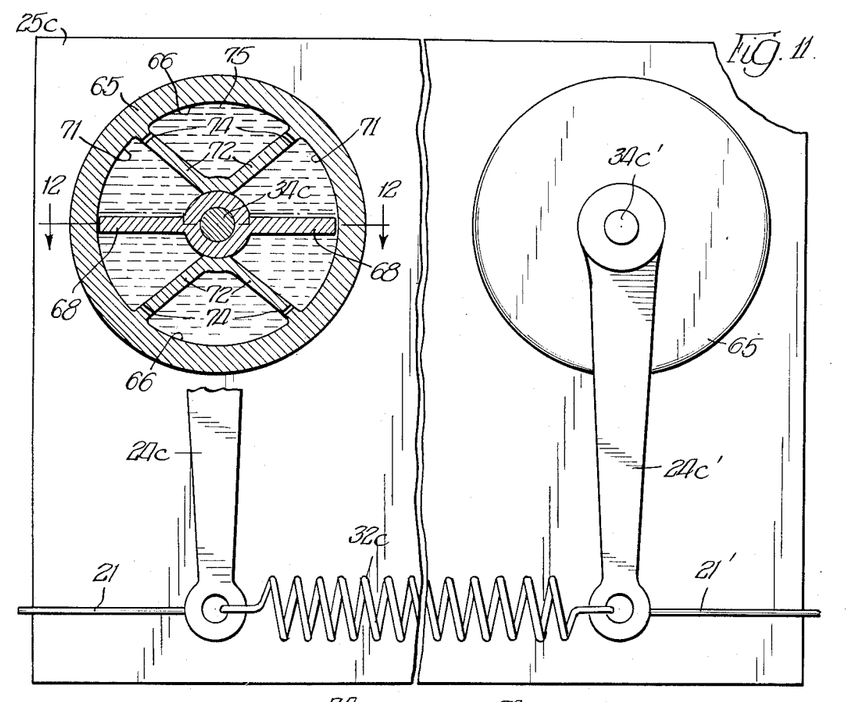
Figure 11 is a fragmentary front view, partly in section, showing another embodiment employing hydraulic damping mechanism.
Figure 12:
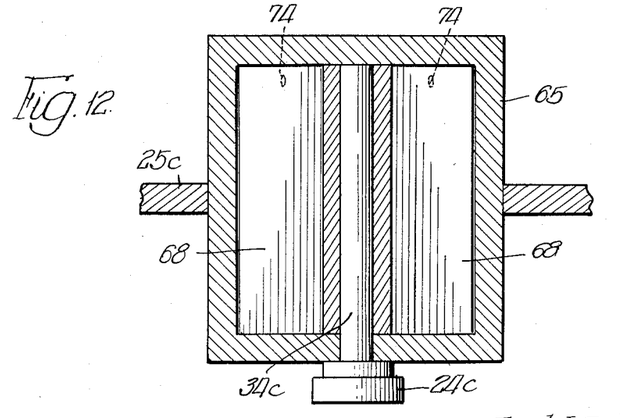
Figure 12 is a horizontal sectional view taken approximately on the plane of the line 12—12 of Figure 11.

In Figures 11 and 12, we have illustrated another embodiment of our invention employing a hydraulic type of damping mechanism for absorbing energy from the transmission line to mitigate galloping therein. In this embodiment, the two pivoted damping arms 24c and 24c' are secured to their respective mounting shafts 34c and 34c' so as to cause these shafts to rotate with the arms. Each shaft extends into the housing 65 of a hydraulic chamber 66. Secured to the shaft within the chamber is a two-bladed vane 68. The diametrically opposite blades of this vane are arranged to oscillate within diametrically opposite arcuate chamber areas 71 defined within the main chamber 66. Radially extending baffles or walls 72 separate the active chamber areas 71 from the reservoir chamber areas 66. Restricted apertures 74 in the baffle walls 72 permit a restricted rate of flow of the hydraulic damping liquid 75 into and out of the active chamber areas 71. The vane blades 68 have a relatively close fit within the chamber areas 71, and angular motion of these blades within these chamber areas is hydraulically damped by the restricted leakage of the liquid around the edges of the vanes and by the restricted flow of the liquid through the calibrated ports 74. The two hydraulic housings 65 are suitably mounted in any preferred manner on the mounting plate 25c, and the lower ends of the arms 24c are connected by the tension spring 32c, substantially as described above in connection with the preceding embodiments. It will be evident that this embodiment also mitigates galloping in a suspended conductor by absorbing energy from the motion of the conductor as soon as an oscillation starts to build up in the conductor. As illustrative of a hydraulic damping unit of the above type which we have successfully used in this capacity, we have employed conventional hydraulic shock absorbers such as were standard equipment on 1935–42 Ford automobiles.

Figure 13:
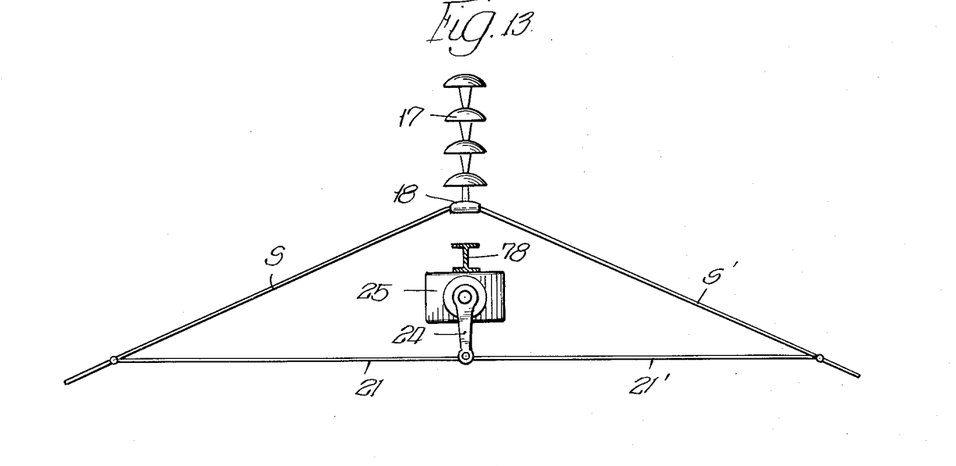
Figure 13 is a front view, somewhat diagrammatic, showing another embodiment wherein the damping mechanism is secured to a stationary point of support.
Figure 14:
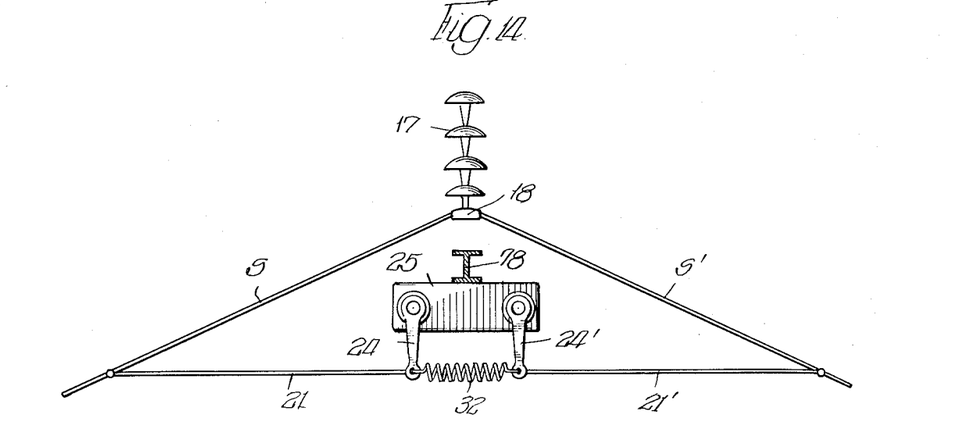
Figure 14 is a view similar to Figure 13, showing the use of two pivoted damping arms in such latter embodiment.

In Figure 13 we have shown a further modification in which the reaction of the energy absorbing damping mechanism is made to occur against a stationary point of support. In such arrangement, the mounting member 25 is mounted on a relatively stationary support typically represented by a supporting arm, cross-bar or the like 78 extending out from the tower or pole 15. The damped motion of the pivoted damping arm 24 thus reacts against this supporting arm 78. This type of installation may be employed where insulation of the cross-tie 21, 21' is not required, as in the case of a grounded lightning shield conductor disposed above the high voltage conductors of a transmission line. However, this type of installation might also be adapted to high voltage conductors by arranging the damping mechanism to be operated through suitable insulating instrumentalities, such as an insulating type of cross-tie 21, 21', or an insulating pivoted arm 24, or both. In this stationarily mounted embodiment we have shown only one pivoted arm 24 responding to both spans S and S' of the conductor and having its angular motion in either direction impeded by any of the previously described frictional or hydraulic damping mechanisms; but it will be understood that this embodiment might employ any of the two-arm constructions illustrated in Figures 3 to 12 inclusive, as shown in Figure 14.

While we have illustrated and described what we regard to be the preferred embodiments of our invention, nevertheless it will be understood that such are merely exemplary and that numerous modifications and rearrangements may be made therein without departing from the essence of the invention.

We claim:

1. In apparatus for mitigating wind-induced galloping oscillations in aerial conductors, the combination of spaced supporting structures, conductor clamps carried by said supporting structures, a conductor supported by said clamps and extending in spans between said supporting structures, mounting means connected with said conductor clamps at a plurality of said supporting structures, a pair of damping members movably mounted upon each of said mounting means below and independent of the associated conductor clamp, means connecting said damping members with adjacent spans of said conductors at points substantially removed from the clamped point of support of the conductor established by the associated conductor clamp, and spring means connected between said pair of damping members.

2. In apparatus of the class described for mitigating wind-induced galloping oscillations in aerial conductors, the combination of spaced supporting structures, supporting insulators carried thereby, conductor clamps suspended from said supporting insulators, a conductor engaged by said clamps and extending in spans between such points of clamping support, mounting plates suspended from said conductor clamps at a plurality of said supporting structures, a pair of arms pivotally mounted on each mounting plate for swinging movement independently of the associated conductor clamp, a tension spring connected between said pair of arms, and means connecting said pivoted arms with adjacent spans of said conductor at points below and spaced outwardly from the associated conductor clamp for damping such galloping oscillations.

3. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, damping arms pivotally mounted on said mounting means for pivotal movement independently of said conductor clamping means, flexible tie wires connecting said damping arms with adjacent spans of said conductor at points spaced outwardly and downwardly of said conductor clamping means, spring means connected to act on said damping arms and friction slippage means connected between said damping arms and said mounting means and operative upon pivotal motion of said damping arms relatively to said mounting means to create an energy absorbing damping action tending to oppose such pivotal motion.

4. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, damping arm means pivotally mounted on said mounting means for pivotal movement independently of said conductor clamping means, flexible tie wires connecting said damping arm means with adjacent spans of said conductor at points spaced outwardly and downwardly of said conductor clamping means, and resilient means connected between said damping arm means and said mounting means and operative upon pivotal motion of said damping arm means relatively to said mounting means to act in flexure and thereby create an energy absorbing damping action tending to oppose such pivotal motion.

5. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, damping arms pivotally mounted on said mounting means for pivotal movement independently of said conductor clamping means, flexible tie wires connecting said damping arms with adjacent spans of said conductor at points spaced outwardly and downwardly of said conductor clamping means, spring means connected between said damping arms and hydraulic mechanism connected between said damping arms and said mounting means and operative upon pivotal motion of said damping arms relatively to said mounting means to create an energy absorbing damping action tending to oppose such pivotal motion.

6. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, a pair of swinging arms coaxially pivotally mounted on said mounting means for pivotal movement independently of said conductor clamping means, flexible tie wires connecting said arms with adjacent spans of said conductor at points spaced outwardly and downwardly of said conductor clamping means, spring means connected between said pair of swinging arms and damping means connected between said arms and operative upon relative pivotal movement between said arms to create an energy absorbing damping action tending to oppose such relative pivotal movement.

7. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, damping arms pivotally mounted on said mounting means for pivotal movement independently of said conductor clamping means, flexible tie wires connecting said damping arms with adjacent spans of said conductor at points spaced outwardly and downwardly of said conductor clamping means, spring means connected between said damping arms, and damping means connected between said damping arms and said mounting means and operative upon relatively small amplitude oscillations of said damping arms to act in flexure in damping such oscillations, and operative upon relatively large amplitude oscillations of said damping arms to act by relative friction slippage between friction surfaces in damping the latter oscillations.

8. In apparatus for mitigating wind-induced galloping oscillations in aerial conductors, the combination of spaced supporting structures, conductor clamps carried by said supporting structures, a conductor supported by said clamps and extending in spans between said supporting structures, mounting means connected with said conductor clamps at a plurality of said supporting structures, a pair of damping members movably mounted upon each of said mounting means below and independent of the associated conductor clamp, means connecting said damping members with adjacent spans of said conductors at points substantially removed from the clamped point of support of the conductor established by the associated conductor clamp, spring means connected between said pair of damping members, and a protective housing enclosing said pair of damping members and spring means from the weather.

9. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, a pair of arms pivotally mounted on said mounting means for swinging movement independently of said conductor clamping means, tie connections between said arms and adjacent spans of said conductor, a damping spring connected between said arms, energy absorbing means damping relative pivotal motion between said arms, and a protective housing enclosing said arms, spring and energy absorbing means from the weather.

10. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, a pivot shaft carried by said mounting means, damping arm means carried by said pivot shaft and normally extending in a substantially vertical plane from the axis of said pivot shaft, flexible cross tie wires connected with the swinging end of said damping arm means and extending substantially horizontally outwardly from said swinging end and having attachment to the adjacent spans of said conductor at points spaced outwardly and downwardly of said conductor clamping means, whereby said flexible cross tie wires are operative in tension to pull said damping arm means to right or left from its normal substantially vertical position in response to oscillations in the conductor, and damping means connected between said damping arm means and said mounting means and operative upon such pivotal motion of said damping arm means to create an energy absorbing damping action tending to oppose such pivotal motion.

11. In apparatus of the class described for mitigating wind-induced galloping oscillations in aerial conductors, the combination of spaced supporting structures, a conductor suspended in spans between said supporting structures, mounting means carried by a plurality of said supporting structures each comprising conductor clamping means having clamping engagement with the conductor between spans, a pivoted arm carried by said mounting means, tie connections between said pivoted arm and the adjacent spans of said conductor, a hydraulic damping chamber containing a damping liquid, and a vane connected to said pivoted arm and arranged to have a damped movement within said hydraulic damping chamber in response to motion of said arm.

12. In apparatus of the class described for mitigating wind-induced galloping oscillations in aerial conductors, the combination of spaced supporting structures, supporting insulators carried thereby, conductor suspension clamps suspended from said supporting insulators, a conductor engaged by said clamps and extending in spans between such points of clamping support, and damping apparatus at a plurality of said supporting structures each comprising a mounting member disposed below the conductor suspension clamp associated with that supporting structure, damping arm means pivotally mounted on said mounting member for pivotal movement independently of said conductor suspension clamp, flexible tie wires connecting said damping arm means with adjacent spans of said conductor at points spaced outwardly and downwardly of said conductor suspension clamp, and energy absorbing means connected between said damping arm means and said mounting member and operative upon pivotal motion of said damping arm means relatively to said mounting member to create an energy absorbing damping action tending to oppose such pivotal motion.

References Cited in the file of this patent

UNITED STATES PATENTS

| Number | Name | Date |
|---|---|---|
| 803,589 | Hartford | Nov. 7, 1905 |
| 911,973 | Goddard | Feb. 9, 1909 |
| 1,319,374 | Cahen | Oct. 21, 1919 |
| 1,872,605 | Pohlhausen | Aug. 16, 1932 |
| 1,965,494 | Goodrich | July 3, 1934 |
| 1,995,190 | Rostoker | Mar. 19, 1935 |
| 2,043,717 | Stickley | June 9, 1936 |
| 2,058,174 | Monroe | Oct. 20, 1936 |
| 2,065,336 | Langton | Dec. 22, 1936 |
| 2,149,875 | Talbott | Mar. 7, 1939 |
| 2,374,823 | Leib et al. | May 1, 1945 |

FOREIGN PATENTS

| Number | Country | Date |
|---|---|---|
| 503,445 | Great Britain | Apr. 6, 1939 |
| 799,112 | France | May 4, 1947 |